US012694486B2

(12) United States Patent (10) Patent No.: US 12,694,486 B2
Otani (45) Date of Patent: Jul. 28, 2026

(54) LEARNING DEVICE, NOISE REMOVAL DEVICE, AND PROGRAM

(71) Applicant: FUJIFILM CORPORATION, Tokyo (JP)

(72) Inventor: Keita Otani, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/890,755

(22) Filed: Sep. 20, 2024

(65) Prior Publication Data

US 2025/0111483 A1     Apr. 3, 2025

(30) Foreign Application Priority Data

Sep. 28, 2023     (JP) ................................. 2023-168699

(51) Int. Cl.
*G06T 5/70* (2024.01)

(52) U.S. Cl.
CPC ...... *G06T 5/70* (2024.01); *G06T 2207/20182* (2013.01)

(58) Field of Classification Search
CPC ............. G06T 5/70; G06T 2207/20182; G06T 2207/10116; G06T 2207/20081; G06T 2207/20084; G06T 5/60; G06N 3/045; G06N 3/08; G06N 3/0475
See application file for complete search history.

(56) References Cited

U.S. PATENT DOCUMENTS

| | | | | |
|---|---|---|---|---|
| 2016/0328647 A1* | 11/2016 | Lin | ........................... | G06N 3/08 |
| 2019/0156524 A1* | 5/2019 | Park | ........................... | G06T 5/60 |
| 2019/0365341 A1* | 12/2019 | Chan | ..................... | A61B 6/5258 |
| 2020/0097772 A1* | 3/2020 | Nakanishi | ............. | G06F 18/217 |
| 2021/0081801 A1* | 3/2021 | Sakai | ..................... | G06N 3/084 |
| 2022/0107378 A1* | 4/2022 | Dey | ......................... | G06N 3/09 |
| 2022/0327662 A1* | 10/2022 | Matsuura | .............. | G06T 3/4053 |
| 2023/0134942 A1* | 5/2023 | Chung | .................. | G10L 15/187 |
| | | | | 704/243 |

(Continued)

OTHER PUBLICATIONS

S. Dittmer et al., "Ground Truth Free Denoising by Optimal Transport", arxiv.org, Cornell University, 201 Olin Library Cornell University Ithaca, NY 14853, [Online] p. 1-11, Jul. 3, 2020.

(Continued)

*Primary Examiner* — Michael Lee

(74) *Attorney, Agent, or Firm* — SOLARIS Intellectual Property Group, PLLC

(57) ABSTRACT

A learner, a noise reduction device, and a program that can train a noise reducer even in a case where learning data having a smaller amount of noise than a normal captured image cannot be acquired or in a case where an amount of noise in learning data having the same noise as the normal captured image is unknown are provided. A learner includes a noise reducer that reduces noise of first learning data using a noise reducer that is trainable, a noise addition unit that adds predetermined noise to be added to the first learning data in which the noise is reduced, and a learning unit that trains the noise reducer to bring a distribution of the first learning data to which the noise to be added is added close to a distribution of second learning data.

9 Claims, 16 Drawing Sheets

SUPERVISED LEARNING     MINIMIZE DIFFERENCE

LEARNING DATA → NOISE GENERATOR → NOISE-ADDED LEARNING DATA → NOISE REMOVER → NOISE-REMOVED LEARNING DATA 70     92     72     90     74

UNSUPERVISED LEARNING (DIFFERENTIABLE)

LEARNING DATA → NOISE REMOVER → NOISE-REMOVED LEARNING DATA → NOISE GENERATOR → NOISE-REMOVED AND ADDED LEARNING DATA 60     90     62     92     64

(56) References Cited

U.S. PATENT DOCUMENTS

2023/0162328 A1 * 5/2023 Kobayashi ................ G06T 5/70
                                                        382/155
2023/0368337 A1 * 11/2023 Karras ...................... G06T 5/70

OTHER PUBLICATIONS

Wei Wang et al., "Optimal Transport for Unsupervised Denoising Learning", arxiv.org, Cornell University Library 201 Olin Library Cornell University Ithaca, NY 14853, p. 1-40, Apr. 28, 2022.
Liu Yukun et al., "Generative Recorrupted-to-Recorrupted: An Unsupervised Image Denoising Network for Arbitrary Noise Distribution", Remote Sensing, vol. 15, No. 2, p. 1-12, Jan. 6, 2023.
Extended European Search Report dated Feb. 12, 2025, issued in corresponding EP Patent Application No. 24201779.6.
Kai Zhang et al., "Beyond a Gaussian Denoiser: Residual Learning of Deep CNN for Image Denoising", IEEE Transactions on Image Processing, Aug. 13, 2016.
Tongyao Pang et al., "Recorrupted-to-Recorrupted: Unsupervised Deep Learning for Image Denoising", IEEE/CVF Computer Vision and Pattern Recognition, 2021.

* cited by examiner

LEARNING DATA DATABASE

| IMAGE TYPE | IMAGE ID | LEARNING DATA |
|---|---|---|
| CT IMAGE | LV001 | (LEARNING DATA LV1) |
|  | LV002 | (LEARNING DATA LV2) |
|  | ⋮ | ⋮ |
| ULTRASOUND IMAGE | LS001 | (LEARNING DATA LS1) |
|  | ⋮ | ⋮ |
| ⋮ | ⋮ | ⋮ |

FIG. 12

IMAGE DATA DATABASE

| IMAGE TYPE | IMAGE ID | IMAGE DATA |
|---|---|---|
| CT IMAGE | V001 | (IMAGE DATA V1) |
| | V002 | (IMAGE DATA V2) |
| | ⋮ | ⋮ |
| ULTRASOUND IMAGE | S001 | (IMAGE DATA S1) |
| | ⋮ | ⋮ |
| ⋮ | ⋮ | ⋮ |

FIG. 15

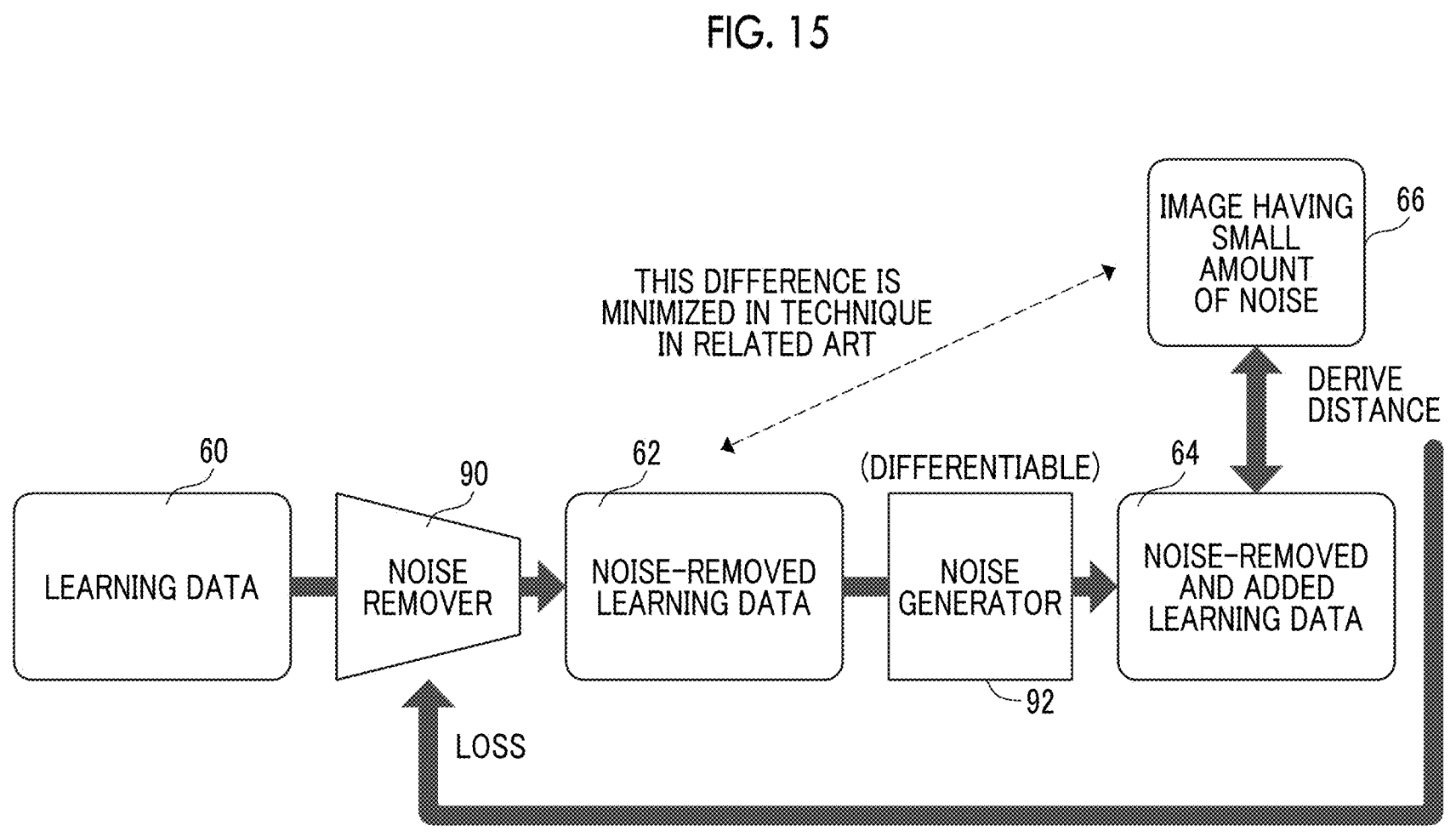

IMAGE HAVING SMALL AMOUNT OF NOISE — 66

DERIVE DISTANCE

NOISE-REMOVED AND ADDED LEARNING DATA — 64

THIS DIFFERENCE IS MINIMIZED IN TECHNIQUE IN RELATED ART (DIFFERENTIABLE)

NOISE GENERATOR — 92

NOISE-REMOVED LEARNING DATA — 62

NOISE REMOVER — 90

LOSS

LEARNING DATA — 60

LEARNING DEVICE, NOISE REMOVAL DEVICE, AND PROGRAM

CROSS-REFERENCE TO RELATED APPLICATION

This application is based on and claims priority under 35 USC 119 from Japanese Patent Application No. 2023-168699, filed on Sep. 28, 2023, the entire disclosure of which is incorporated by reference herein.

BACKGROUND

Technical Field of the Invention

The present disclosure relates to a learning device, a noise removal device, and a program.

Related Art

Improving visibility of an image by reducing noise is an important issue in the field of not only a natural image such as a photograph but also a medical image.

In recent years, many noise reduction methods using deep learning have been suggested, and a technology for training a noise reducer that converts image data having a large amount of noise into image data having a small amount of noise using image data having a small amount of noise or not having noise as training data has been known (for example, refer to Beyond a Gaussian Denoiser: Residual Learning of Deep CNN for Image Denoising (Zhang+, IEEE Transactions on Image Processing)).

However, this technology cannot be applied to a situation where image data having a smaller amount of noise than a normal captured image cannot be acquired. For example, in radiography of a human body, while image data having a small amount of noise can be obtained by increasing a dose rate compared to that in normal imaging, it is extremely difficult to obtain the image data in reality because an exposure rate is also increased.

In order to deal with this issue, a technology for training a noise reducer using only image data having the same noise as a normal captured image as image data for learning has also been suggested (for example, refer to Recorrupted-to-Recorrupted: Unsupervised Deep Learning for Image Denoising (Pang+, IEEE/CVF Computer Vision and Pattern Recognition 2021)).

However, in the technology for training the noise reducer using only the image data having the same noise as the normal captured image as the image data for learning, an issue arises in that an amount of each noise in the image data for learning has to be known. Hereinafter, the image data used for training the noise reducer will be referred to as "learning data".

SUMMARY

According to an aspect of the present disclosure, there is provided a learner comprising at least one processor, in which the processor is configured to reduce noise of first learning data using a noise reducer that is trainable, add predetermined noise to be added to the first learning data in which the noise is reduced, and train the noise reducer to bring a distribution of the first learning data to which the noise to be added is added close to a distribution of second learning data.

BRIEF DESCRIPTION OF THE DRAWINGS

FIG. 8 is a block diagram illustrating an example of an aspect of use of a Wasserstein generative adversarial network (GAN) with gradient penalty (–GP) (hereinafter, referred to as a "WGAN-GP") according to the embodiment.

FIG. 10 is a block diagram for more specifically describing the learning processing according to the first embodiment.

FIG. 11 is a schematic diagram illustrating an example of a configuration of a learning data database according to the embodiment.

FIG. 12 is a schematic diagram illustrating an example of a configuration of an image database according to the embodiment.

FIG. 15 is a block diagram for describing learning processing according to a second embodiment.

DETAILED DESCRIPTION

Hereinafter, embodiments of the present disclosure will be described in detail with reference to the drawings.

A case where a learning device (or a learner) that trains a noise reducer which removes (or reduces) noise of various types of medical image data is applied as a learning device of the disclosed technology will be described in the present embodiment. However, the present disclosure is not limited to this aspect and may include an aspect in which a learning device that trains a noise reducer which removes noise of an image other than a medical image, such as image data obtained by performing imaging via a visible light camera or image data obtained by performing imaging via an infrared camera, is applied as the learning device of the disclosed technology. The present disclosure may also include an aspect in which a learning device that trains a noise reducer which removes noise of audio data such as ultrasound data or audible data is applied as the learning device of the disclosed technology.

First Embodiment

Figure 1:
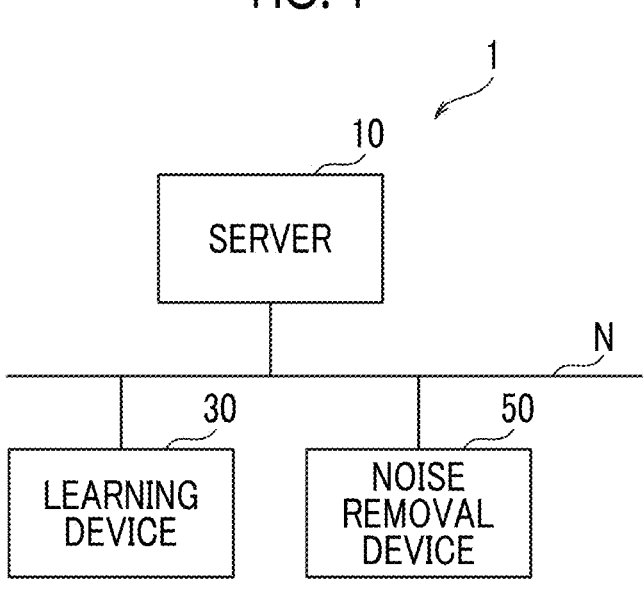
FIG. 1 is a block diagram illustrating an example of a configuration of an image processing system according to an embodiment.

First, a configuration of an image processing system 1 according to the present embodiment will be described with reference to FIG. 1. FIG. 1 is a block diagram illustrating an example of the configuration of the image processing system 1 according to the present embodiment.

As illustrated in FIG. 1, the image processing system 1 according to the present embodiment includes a server 10 configured as a cloud server or the like, a learning device 30 as the learning device of the present disclosure, and a noise removal device (or a noise reduction device) 50 as a noise removal device of the present disclosure. Examples of the server 10, the learning device 30, and the noise removal device 50 include information processing apparatuses such as a personal computer and a server computer.

The server 10 according to the present embodiment stores learning data used for training a noise reducer, which will be described in detail later, via the learning device 30, target medical image data for actually removing noise via the noise removal device 50, the noise reducer, a noise generator, which will be described in detail later, and the like. As described above, in the image processing system 1 according to the present embodiment, the noise reducer and the noise generator are stored in the server 10. However, the present disclosure is not limited to this aspect. For example, the present disclosure may include an aspect in which the noise reducer and the noise generator are stored in the learning device 30 or in the noise removal device 50. The present disclosure may include an aspect in which a device accessible from the learning device 30 and from the noise removal device 50 is applied as a device storing the noise reducer and the noise generator.

The server 10, the learning device 30, and the noise removal device 50 are connected to each other through a network N. The server 10, the learning device 30, and the noise removal device 50 can communicate with each other through the network N.

In the present embodiment, a combination of a public communication line such as the internet or a telephone line network and an in-hospital communication line such as a local area network (LAN) or a wide area network (WAN) is applied as the network N. However, the present disclosure is not limited to this aspect. For example, the present disclosure may include an aspect in which only one of the public communication line or the in-hospital communication line is applied as the network N. In the present embodiment, wired and wireless communication lines are applied as the network N. However, the present disclosure is not limited to this aspect and may include an aspect in which only one of the wireless communication line or the wired communication line is applied.

Figure 2:
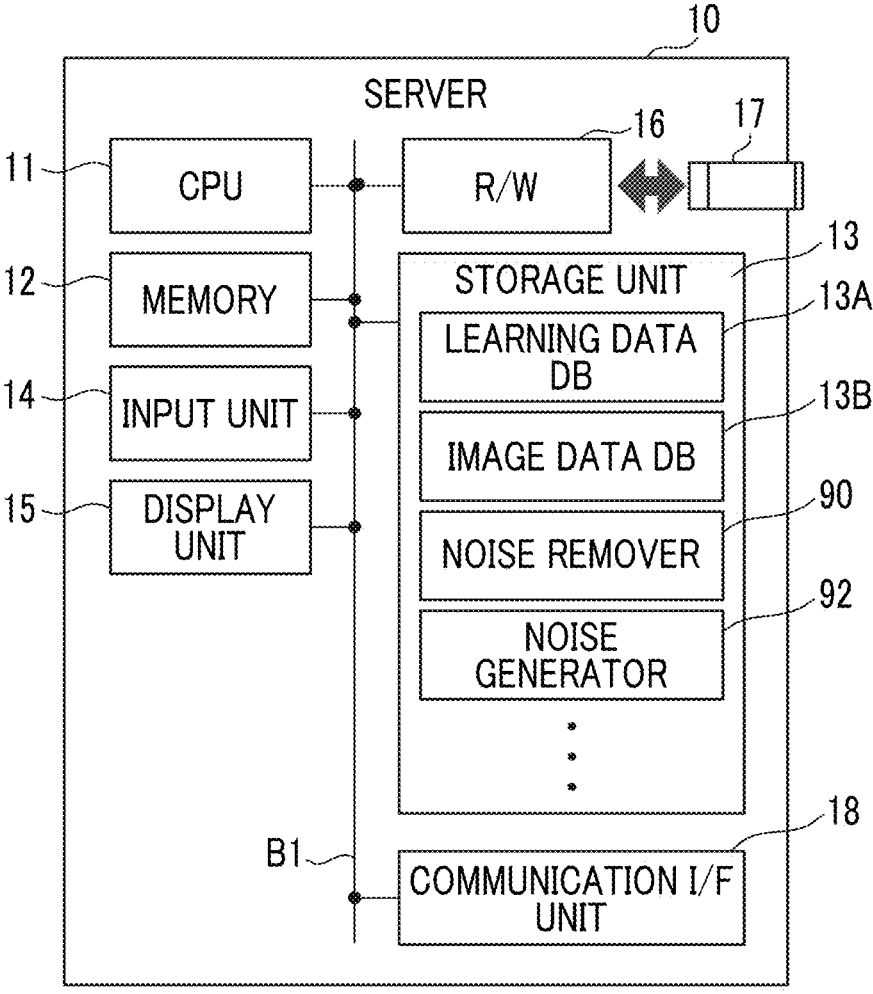
FIG. 2 is a block diagram illustrating an example of a configuration of an electrical system of a server according to the embodiment.

Next, a configuration of the server 10 according to the present embodiment will be described with reference to FIG. 2. FIG. 2 is a block diagram illustrating an example of a configuration of an electrical system of the server 10 according to the present embodiment.

As illustrated in FIG. 2, the server 10 according to the present embodiment comprises a central processing unit (CPU) 11 as a processor, a memory 12 as a temporary storage region, a non-volatile storage unit 13, an input unit 14 such as a keyboard and a mouse, a display unit 15 such as a liquid crystal display, a medium reading and writing device (R/W) 16, and a communication interface (I/F) unit 18. The CPU 11, the memory 12, the storage unit 13, the input unit 14, the display unit 15, the medium reading and writing device 16, and the communication I/F unit 18 are connected to each other through a bus B1. The medium reading and writing device 16 reads out information written on a recording medium 17 and writes information onto the recording medium 17.

The storage unit 13 according to the present embodiment is implemented by a hard disk drive (HDD), a solid state drive (SSD), a flash memory, or the like. The storage unit 13 as a storage medium stores a learning data database 13A and an image data database 13B. The learning data database 13A and the image data database 13B will be described in detail later.

The storage unit 13 also stores a noise reducer 90 and a noise generator 92 described above. The noise reducer 90 according to the present embodiment is configured as a deep learning model. However, the present disclosure is not limited to this. For example, the present disclosure may include an aspect in which other noise reducers such as a bilateral filter that involve learning are applied as the noise reducer 90. In a case where a bilateral filter is used as the noise reducer 90, the learning device 30, which will be described later, learns parameters of the bilateral filter.

Figure 3:
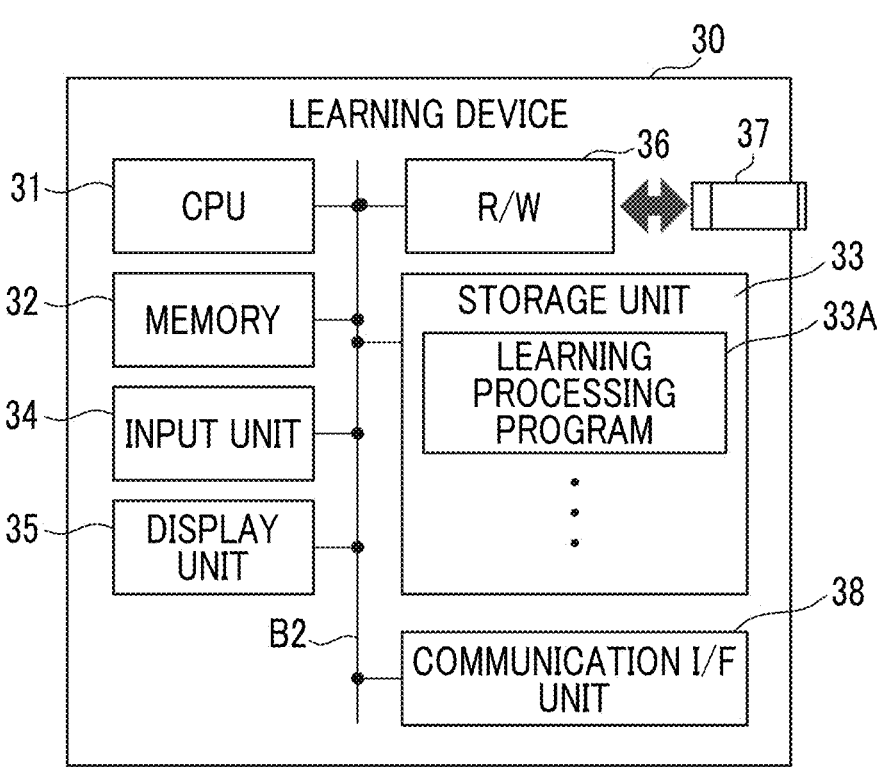
FIG. 3 is a block diagram illustrating an example of a configuration of an electrical system of a learner according to the embodiment.

Next, a configuration of the learning device 30 according to the present embodiment will be described with reference to FIG. 3. FIG. 3 is a block diagram illustrating an example of a configuration of an electrical system of the learning device 30 according to the present embodiment.

As illustrated in FIG. 3, the learning device 30 according to the present embodiment comprises a CPU 31 as a processor, a memory 32 as a temporary storage region, a non-volatile storage unit 33, an input unit 34 such as a keyboard and a mouse, a display unit 35 such as a liquid crystal display, a medium reading and writing device (R/W) 36, and a communication I/F unit 38. The CPU 31, the memory 32, the storage unit 33, the input unit 34, the display unit 35, the medium reading and writing device 36, and the communication I/F unit 38 are connected to each other through a bus B2. The medium reading and writing device 36 reads out information written on a recording medium 37 and writes information onto the recording medium 37.

The storage unit 33 according to the present embodiment is implemented by an HDD, an SSD, a flash memory, or the like. The storage unit 33 as a storage medium stores a learning processing program 33A. The learning processing program 33A is stored (installed) in the storage unit 33 by connecting the recording medium 37 on which the program 33A is written to the medium reading and writing device 36 and reading out the program 33A from the recording medium 37 via the medium reading and writing device 36. The CPU 31 reads out the learning processing program 33A into the memory 32 from the storage unit 33, as appropriate, and sequentially executes processes of the program 33A.

Figure 4:
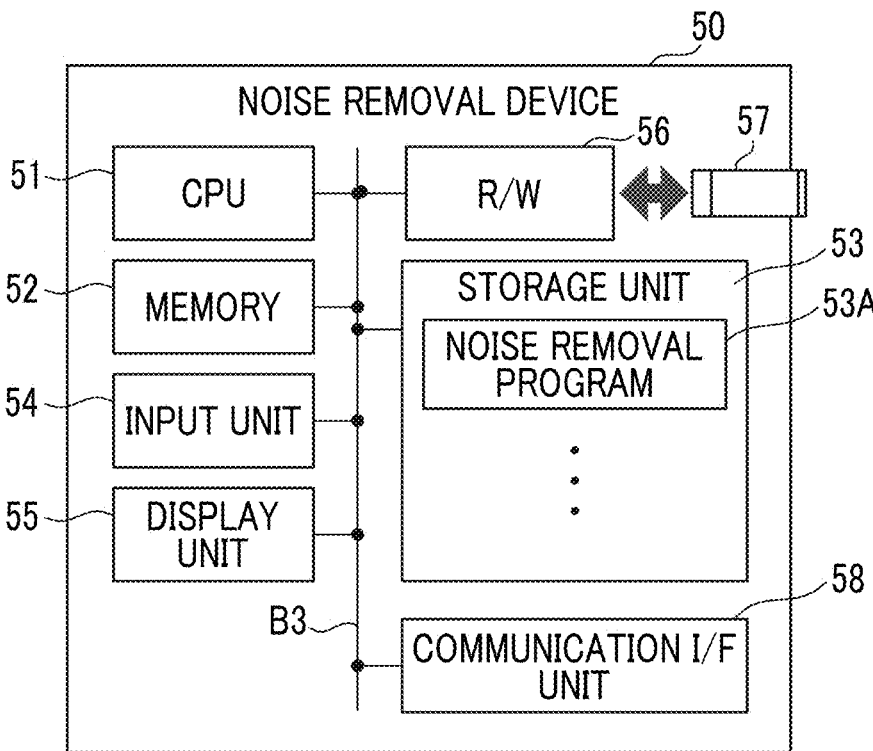
FIG. 4 is a block diagram illustrating an example of a configuration of an electrical system of a noise reduction device according to the embodiment.

Next, a configuration of the noise removal device 50 according to the present embodiment will be described with reference to FIG. 4. FIG. 4 is a block diagram illustrating an example of a configuration of an electrical system of the noise removal device 50 according to the present embodiment.

As illustrated in FIG. 4, the noise removal device 50 according to the present embodiment comprises a CPU 51 as a processor, a memory 52 as a temporary storage region, a non-volatile storage unit 53, an input unit 54 such as a keyboard and a mouse, a display unit 55 such as a liquid crystal display, a medium reading and writing device (R/W) 56, and a communication I/F unit 58. The CPU 51, the memory 52, the storage unit 53, the input unit 54, the display unit 55, the medium reading and writing device 56, and the communication I/F unit 58 are connected to each other through a bus B3. The medium reading and writing device 56 reads out information written on a recording medium 57 and writes information onto the recording medium 57.

The storage unit 53 according to the present embodiment is implemented by an HDD, an SSD, a flash memory, or the like. The storage unit 53 as a storage unit stores a noise removal program 53A. The noise removal program 53A is stored (installed) in the storage unit 53 by connecting the recording medium 57 on which the program 53A is written to the medium reading and writing device 56 and reading out the program 53A from the recording medium 57 via the medium reading and writing device 56. The CPU 51 reads out the noise removal program 53A into the memory 52 from the storage unit 53, as appropriate, and sequentially executes processes of the noise removal program 53A.

Figure 5:
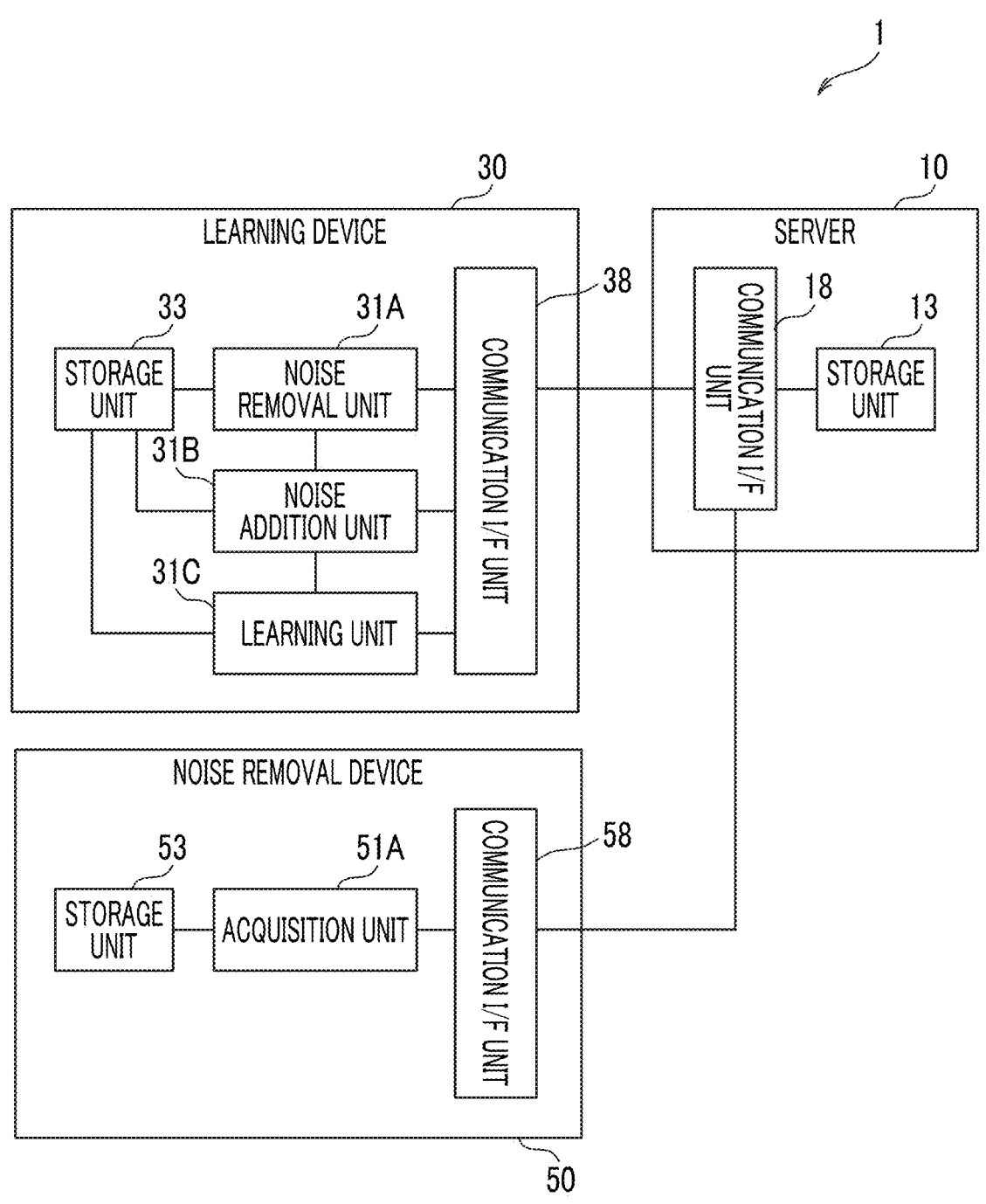
FIG. 5 is a functional block diagram illustrating functional configurations of the learner and the noise reduction device in the image processing system according to the embodiment.

Next, functional configurations of the learning device 30 and the noise removal device 50 in the image processing system 1 according to the present embodiment will be described with reference to FIG. 5. FIG. 5 is a block diagram illustrating an example of the functional configurations of the learning device 30 and the noise removal device 50 in the image processing system 1 according to the present embodiment.

As illustrated in FIG. 5, the learning device 30 according to the present embodiment includes a noise removal unit 31A, a noise addition unit 31B, and a learning unit 31C. The CPU 31 of the learning device 30 functions as the noise removal unit 31A, the noise addition unit 31B, and the learning unit 31C by executing the learning processing program 33A.

The noise removal unit 31A according to the present embodiment removes noise of first learning data using the noise reducer 90 that is trainable. The noise addition unit 31B according to the present embodiment adds predetermined noise to be added to the first learning data from which noise is removed by the noise reducer 90. The learning unit 31C according to the present embodiment trains the noise reducer 90 to bring a distribution of the first learning data to which the noise to be added is added by the noise addition unit 31B close to a distribution of second learning data.

In the present embodiment, the same data as the first learning data is applied as the second learning data. However, the present disclosure is not limited to this. The present disclosure may include an aspect in which learning data different from the first learning data is applied as the second learning data.

In the present embodiment, noise that resembles the noise of the first learning data is applied as the noise to be added. However, the present disclosure is not limited to this. For example, the present disclosure may include an aspect in which noise corresponding to radiation noise generated from a device near an imaging apparatus that has acquired the first learning data is applied as the noise to be added irrespective of the noise of the first learning data.

The learning unit 31C according to the present embodiment trains the noise reducer 90 to make the distribution of the first learning data to which the noise to be added is added and the distribution of the second learning data unidentifiable by a predetermined identifier. Particularly, the learning unit 31C according to the present embodiment trains the noise reducer 90 to minimize a degree of deviation between the distribution of the first learning data to which the noise to be added is added and the distribution of the second learning data.

In the present embodiment, a W distance is applied as the degree of deviation. However, the present disclosure is not limited to this. For example, the present disclosure may include an aspect in which a value based on an information amount such as a Kullback-Leibler divergence is applied as the degree of deviation.

In a case where the W distance is applied as the degree of deviation, a GAN or a model similar to a GAN is used. In a case where the Kullback-Leibler divergence is applied, a diffusion model, an autoregressive model, or the like is used. Examples of the autoregressive model include a PixelCNN autoencoder.

In a case where a GAN or a model similar to a GAN is used, an inference can be quickly made, but learning is slightly unstable. Meanwhile, in a case where a diffusion model or an autoregressive model is used, an inference is made slightly slowly, but learning is stable.

In addition to the W distance or the Kullback-Leibler divergence, an information amount suitable for a model applicable to comparison between original data and data obtained by adding noise after removing noise from the original data is preferably applied as the degree of deviation.

The noise removal device 50 according to the present embodiment includes an acquisition unit (or an acquirer) 51A. The CPU 51 of the noise removal device 50 functions as the acquisition unit 51A by executing the noise removal program 53A.

The acquisition unit 51A according to the present embodiment acquires data from which noise included in the data is removed, by inputting predetermined data (in the present embodiment, medical image data) into the noise reducer 90 trained by the learning device 30.

Figure 6:
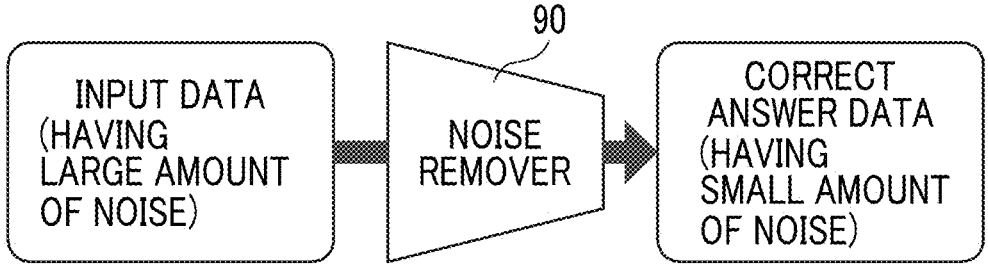
FIG. 6 is a block diagram for describing a technology in the related art.
Figure 7:
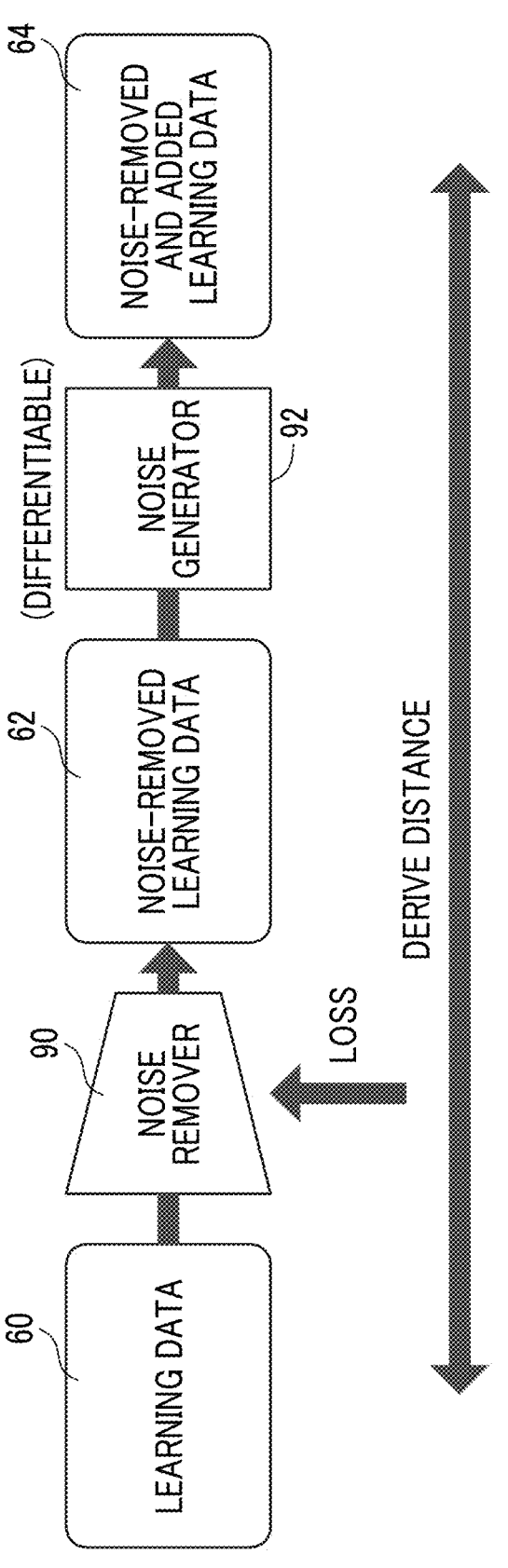
FIG. 7 is a block diagram for describing learning processing according to a first embodiment.
Figure 8:
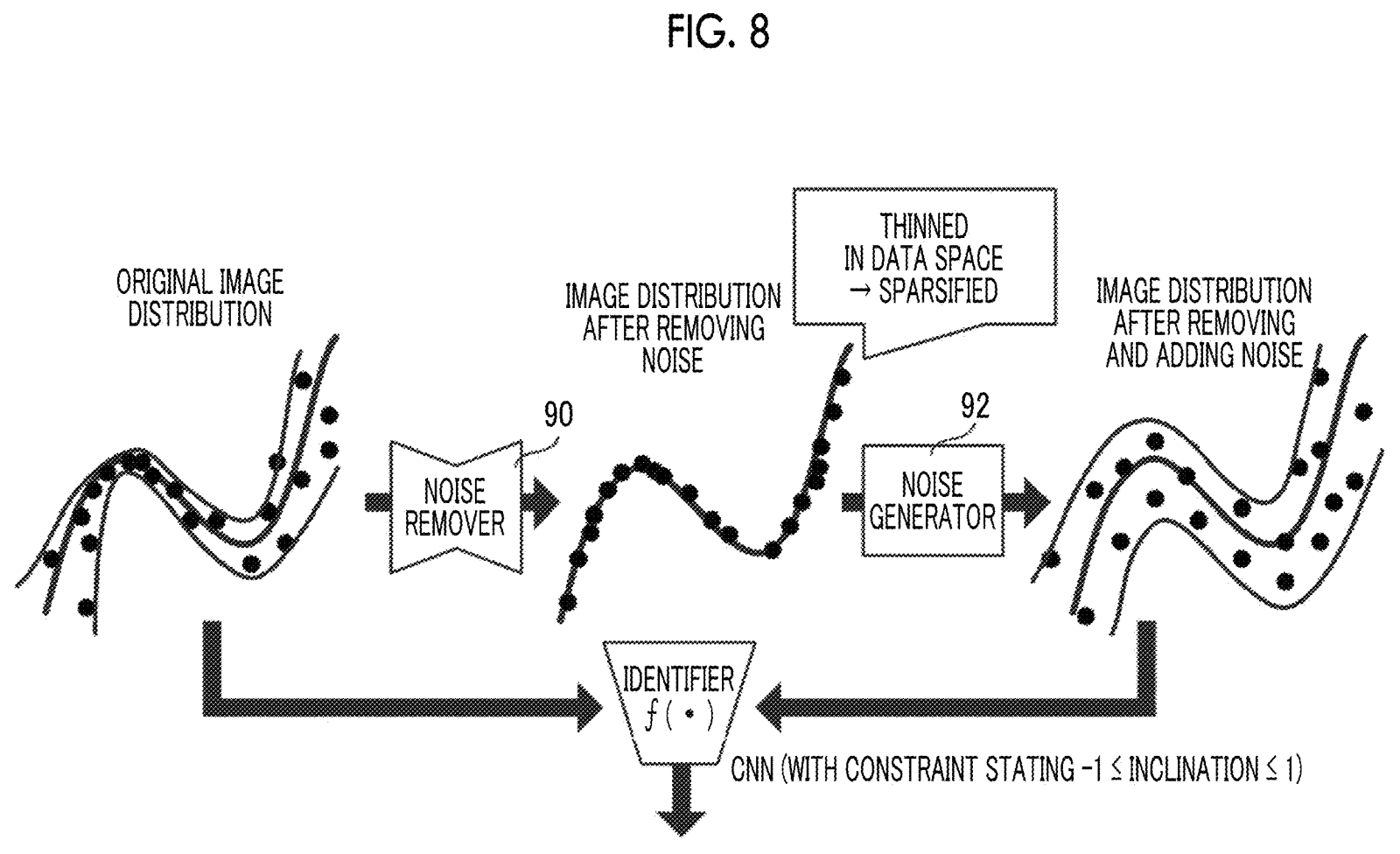
Figure 9:
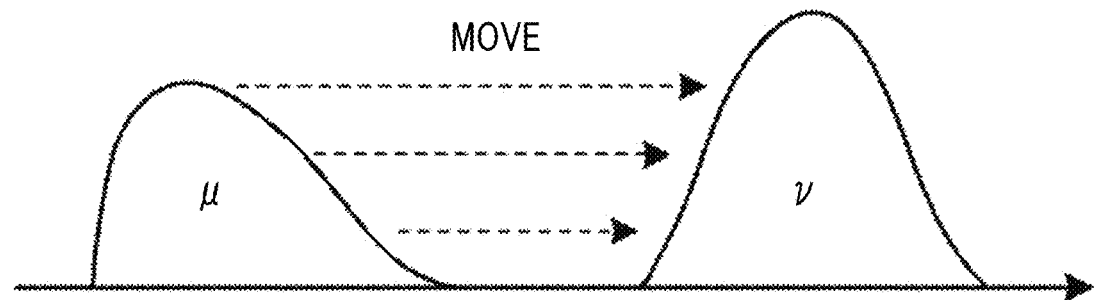
FIG. 9 is a graph for describing a Wasserstein distance (hereinafter, referred to as a "W distance") according to the embodiment.
Figure 10:
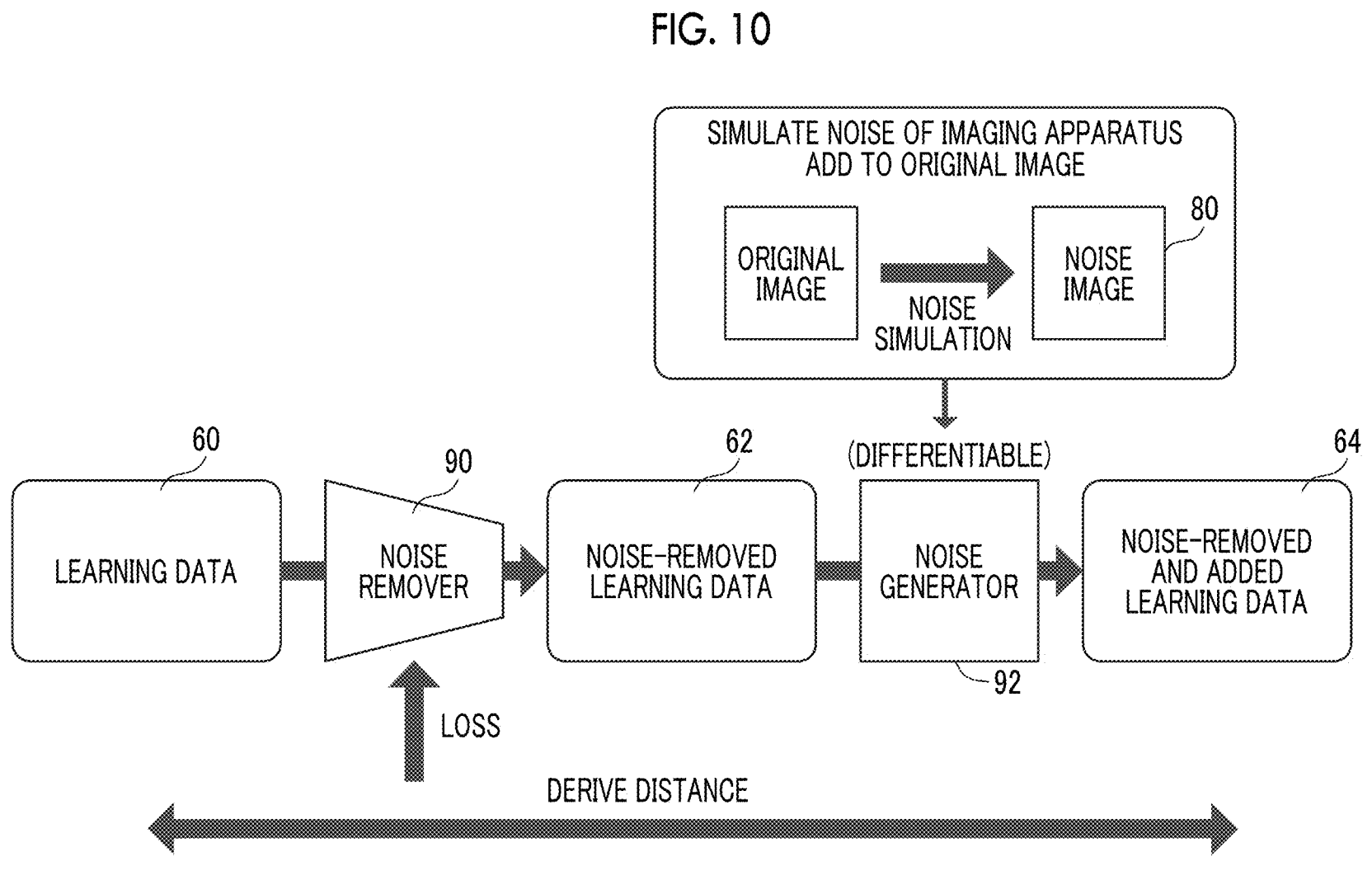

Next, a method of training the noise reducer 90 via the learning device 30 according to the present embodiment will be described with reference to FIGS. 6 to 10. FIG. 6 is a block diagram for describing a technology in the related art, and FIG. 7 is a block diagram for describing learning processing according to the present embodiment. FIG. 8 is a block diagram illustrating an example of an aspect of use of a WGAN-GP according to the present embodiment, and FIG. 9 is a graph for describing the W distance according to the present embodiment. FIG. 10 is a block diagram for more specifically describing the learning processing according to the present embodiment.

For example, as illustrated in FIG. 6, in a case of training the noise reducer 90 for obtaining image data having a smaller amount of noise than input image data by removing noise from the image data, image data having a small amount of noise or not having noise is required as correct answer data.

However, it is difficult to acquire such correct answer data because emission of radiation having a high dose rate to a human body is required in a case where a radiation image is a target, and a large amount of thermal noise is present in a case where an infrared image is a target. For example, reducing noise of a radiation image to its $1/10$ requires radiation having a dose rate that is 100 times higher, and an exposure rate of the radiation is extremely high.

Therefore, for example, as illustrated in FIG. 7, in the learning device 30 according to the present embodiment, the noise removal unit 31A first generates noise-removed learning data 62 by removing noise from learning data 60 using the noise reducer 90 as a training target. Next, in the learning device 30 according to the present embodiment, the noise addition unit 31B generates noise-removed and added learning data 64 by adding noise to the noise-removed learning data 62 using the noise generator 92. In the learning device 30 according to the present embodiment, the learning unit 31C trains the noise reducer 90 to bring a distribution of the noise-removed and added learning data 64 close to a distribution of the learning data 60. In the present embodiment, a U-Net that is a model for semantic segmentation and that is one type of fully convolutional networks (FCN) is applied as the noise reducer 90. However, the present disclosure is not limited to this. For example, the present disclosure may include an aspect in which a convolutional autoencoder, a PixelCNN autoencoder, or the like is applied as the noise reducer 90.

In the learning device 30 according to the present embodiment, a method of training the noise reducer 90 to minimize a distance between an image distribution of the noise-removed and added learning data 64 and an image distribution of the learning data 60 (in FIG. 7, referred to as "loss") is applied as a method of training for bringing the distribution of the noise-removed and added learning data 64 close to the distribution of the learning data 60.

In the learning device 30 according to the present embodiment, the noise reducer 90 is trained using the WGAN-GP.

That is, for example, as illustrated in FIG. 8, in the learning device 30 according to the present embodiment, the noise-removed learning data 62 in which an image distribution of original learning data (in FIG. 8, referred to as "original image distribution") in a dispersed state because of an effect of noise is converted into a thinned (sparsified) image distribution in a data space is obtained by removing noise of the original learning data via the noise reducer 90.

Next, in the learning device 30 according to the present embodiment, the noise generator 92 adds noise to the noise-removed learning data 62 in which the image distribution is sparsified. Accordingly, the noise-removed and added learning data 64 in which the image distribution is converted into a dispersed state again by adding a noise component is obtained.

In a case where the image distribution of the noise-removed and added learning data 64 obtained as described above is brought closest to the image distribution of the original learning data 60, the image distribution of the noise-removed learning data 62 is in a most thinned state as illustrated in, for example, FIG. 8. Therefore, in the learning device 30 according to the present embodiment, the noise reducer 90 is trained to make the image distribution of the noise-removed and added learning data 64 unidentifiable from the image distribution of the original learning data 60.

Specifically, the learning device 30 according to the present embodiment derives the W distance from f(learning data 60)-f(noise-removed and added learning data 64) using an identifier f and trains the noise reducer 90 to minimize the W distance using a technique of the WGAN-GP.

There is a theorem (Kantorovich-Rubinstein theorem) stating that f(learning data 60)-f(noise-removed and added learning data 64) is the W distance in a case where f is optimized to be maximized with respect to a value of f(learning data 60)-f(noise-removed and added learning data 64) by imposing a constraint stating that an absolute value of an inclination of output with respect to input of the identifier f is less than 1 (−1≤inclination≤1). Accordingly, the W distance is obtained by maximizing the above value using the identifier f, and the learning unit 31C according to the present embodiment trains the noise reducer 90 to minimize the W distance.

For example, as illustrated in FIG. 9, the W distance corresponds to a total of moving distances in a case where, for example, a "landslide of a mountain" is moved from the left to the right, and is equal to Expression (1) below in a case where the absolute value of the maximum inclination of f (x) is limited to 1 (strong duality theorem of the linear programming problem).

[Expression 1]

$$W = \max_{f}(E_{\mu}[f(x)] - E_{v}[f(x)]) \qquad (1)$$

In a case where v is optimized to minimize W as illustrated in Expression (2) below, μ is brought close to v.

[Expression 2]

$$loss = \min_{v} \max_{f} (E_{\mu}[f(x)] - E_{v}[f(x)]) \qquad (2)$$

The above is the gist of the WGAN. In the learning device 30 according to the present embodiment, the learning data 60 is converted into the noise-removed and added learning data 64 in a framework of the WGAN-GP illustrated in FIG. 8.

As described above, in the learning device 30 according to the present embodiment, the noise reducer 90 is trained using the WGAN-GP. However, the present disclosure is not limited to this. For example, as described above, the present disclosure may include an aspect in which a diffusion model is applied to train the noise reducer 90.

In the learning device 30 according to the present embodiment, as illustrated in FIG. 10, for each type of a target image of the noise reducer 90, the noise generator 92 generates a noise image 80 unique to an apparatus that has captured the image, by simulating noise generated in the apparatus or an apparatus of the same type as the apparatus. In the noise generator 92 according to the present embodiment, the generated noise image 80 is added to the noise-removed learning data 62. For example, in a case where the type of the target image of the noise reducer 90 is a computed tomography (CT) image, the noise generator 92 generates the noise image 80 by simulating noise generated in a CT apparatus that has captured the CT image or a CT apparatus of the same type as the CT apparatus, and adds the noise image 80 to the noise-removed learning data 62. Examples of a method of this simulation include a method of performing simulation by modeling a noise generation mechanism of a target apparatus.

As described above, in the present embodiment, the noise image obtained by performing simulation corresponding to the type of the target image is applied as the noise image 80 added to the noise-removed learning data 62. However, the present disclosure is not limited to this.

For example, in a case where Gaussian noise is to be removed from the target image, the Gaussian noise may be applied as the noise image 80. In a case where Poisson noise is to be removed, the Poisson noise may be applied as the noise image 80. Examples of a case where the Gaussian noise is to be removed include a case where noise caused by thermal noise generated in multiple sensors is to be removed. Examples of a case where the Poisson noise is to be removed include a case where shot noise generated in a radiation image or the like is to be removed. The present disclosure may include an aspect in which any model such as the diffusion model learns the noise to be removed and is applied as the noise generator 92 in a case where the noise cannot be represented as simple statistical noise.

In the image processing system 1 according to the present embodiment, a medical image is applied as the target image, as described above. The medical image includes, in addition to the CT image, a simple radiation image, an infrared camera image, an ultrasound echo image, a sinogram (an original signal before reconstruction of the CT image), an endoscope image, and the like.

The simple radiation image is an image for which it is difficult to obtain high image quality image data like the CT image. The infrared camera image is an image for which it is difficult to obtain high image quality image data because infrared rays emitted by an object at a normal temperature are weak, and an amount of noise is increased in a case where a high resolution sensor is used. For the ultrasound echo image, attenuated ultrasound is transmitted to an organ or the like in a deep portion of a body. Thus, the ultrasound echo image is significantly affected by random electrical noise of a sensor, and it is difficult to obtain a signal having a small amount of noise. For the sinogram, it is difficult to obtain high image quality image data like the CT image.

In the image processing system 1 according to the present embodiment, the noise reducer 90 and the noise generator 92 are prepared for each type of the target image for removing noise. However, the present disclosure is not limited to this. For example, the present disclosure may include an aspect in which only one noise reducer 90 and only one noise generator 92 are prepared in accordance with a plurality of types of images.

Next, the learning data database 13A according to the present embodiment will be described with reference to FIG. 11. FIG. 11 is a schematic diagram illustrating an example of a configuration of the learning data database 13A according to the present embodiment.

The learning data database 13A according to the present embodiment is a database in which the learning data 60 is registered and, for example, as illustrated in FIG. 11, stores information about an image type, an image identification (ID), and the learning data in association with each other.

The image type is information indicating a type of corresponding learning data. The image ID is predetermined information that is different for each type of the corresponding learning data in order to individually identify the corresponding learning data. The learning data is information indicating the learning data 60.

Next, the image data database 13B according to the present embodiment will be described with reference to FIG. 12. FIG. 12 is a schematic diagram illustrating an example of a configuration of the image data database 13B according to the present embodiment.

The image data database 13B according to the present embodiment is a database in which target image data for removing noise using the noise reducer 90 trained by the learning device 30 according to the present embodiment is registered and, for example, as illustrated in FIG. 12, stores information about each of the image type, the image ID, and the image data in association with each other.

The image type is information indicating the type of the corresponding image data. The image ID is predetermined information that is different for each type of the corresponding image data in order to individually identify the corresponding image data. The image data is information indicating the target image data for removing noise.

Next, an action of the learning device 30 according to the present embodiment will be described with reference to FIG.

Figure 13:
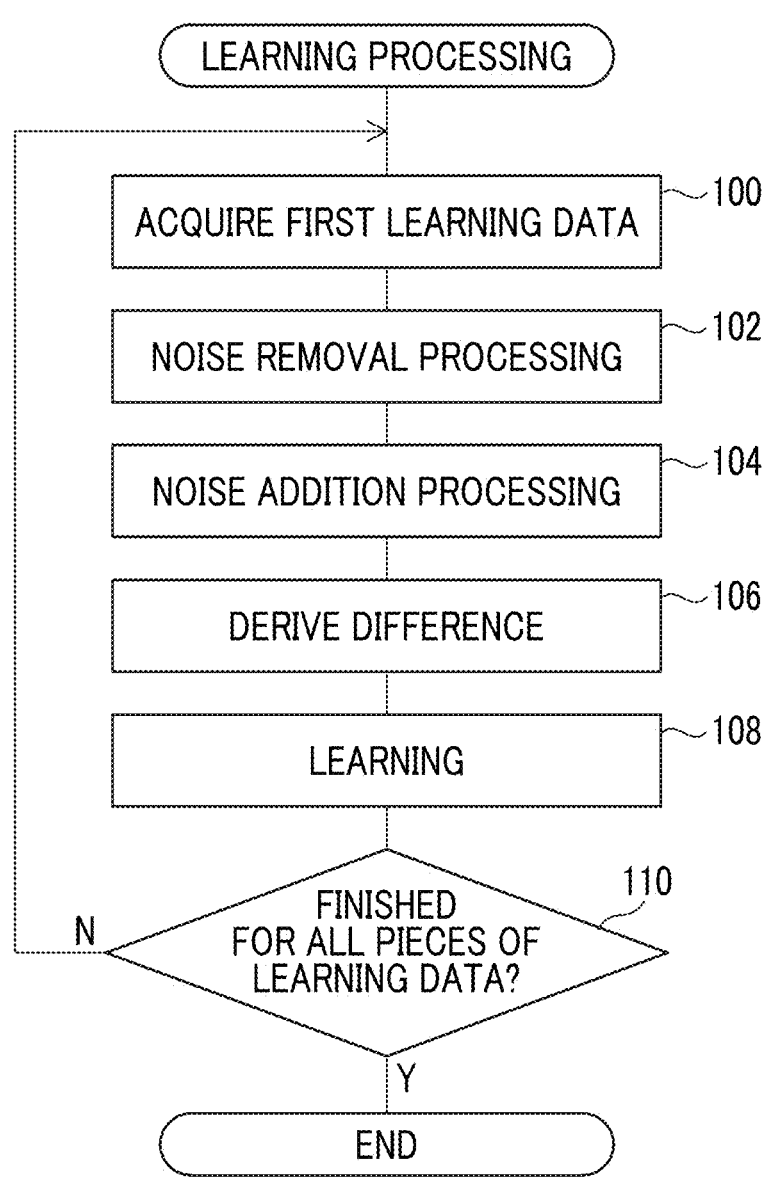
FIG. 13 is a flowchart illustrating an example of the learning processing according to the embodiment.

13. The learning processing illustrated in FIG. 13 is executed by executing the learning processing program 33A via the CPU 31 of the learning device 30. For example, the learning processing illustrated in FIG. 13 is executed in a case where an instruction to start executing the learning processing is input through the input unit 34 by the user. A case where a sufficient amount of learning data for training the noise reducer 90 is registered in the learning data database 13A will be described in order to avoid complication. A case where the type of the target image of the noise reducer 90 as a processing target is designated in advance will be described.

In step 100 in FIG. 13, the CPU 31 reads out any one piece of the learning data (hereinafter, referred to as "processing target learning data") corresponding to the type of the image designated in advance (hereinafter, referred to as a "designated type") from the learning data database 13A.

In step 102, the CPU 31 generates the noise-removed learning data 62 by removing noise from the processing target learning data using the noise reducer 90 corresponding to the designated type (hereinafter, referred to as a "designated noise reducer").

In step 104, the CPU 31 generates the noise-removed and added learning data 64 by adding noise to the generated noise-removed learning data 62 using the noise generator 92 corresponding to the designated type (hereinafter, referred to as a "designated noise generator").

In step 106, the CPU 31 derives a difference (in the present embodiment, the W distance) between the image distribution of the generated noise-removed and added learning data 64 and an image distribution of the processing target learning data as described above. In step 108, the CPU 31 trains the designated noise reducer to minimize the derived difference.

In step 110, the CPU 31 determines whether or not the processing of steps 100 to 108 is finished for all pieces of the learning data corresponding to the designated type registered in the learning data database 13A. In this determination, in a case where a negative determination is made, the learning processing returns to step 100. In a case where a positive determination is made, the learning processing is finished. In a case of repeating execution of the processing of steps 100 to 108, the CPU 31 applies the learning data that has not been targeted so far as the processing target learning data.

Figure 14:
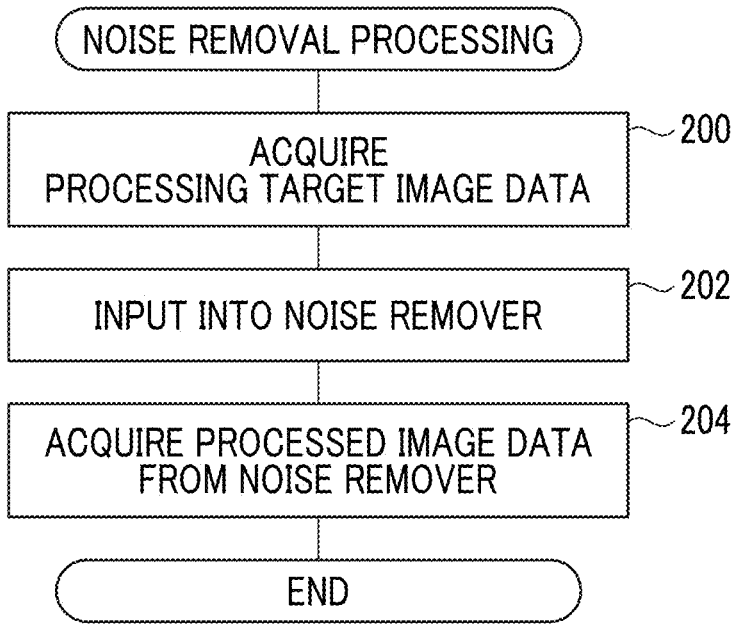
FIG. 14 is a flowchart illustrating an example of noise reduction processing according to the embodiment.

Next, an action of the noise removal device 50 according to the present embodiment will be described with reference to FIG. 14. Noise removal processing illustrated in FIG. 14 is executed by executing the noise removal program 53A via the CPU 51 of the noise removal device 50. For example, the noise removal processing illustrated in FIG. 14 is executed in a case where an instruction to start executing the noise removal processing is input through the input unit 54 by the user. A case where training of the noise reducer 90 as an application target is finished will be described in order to avoid complication. A case where the image data as the processing target and the type of the image indicated by the image data are designated in advance will be described.

In step 200 in FIG. 14, the CPU 51 reads out the image data designated in advance (hereinafter, referred to as "designated image data") from the image data database 13B.

In step 202, the CPU 51 inputs the read designated image data into the noise reducer 90 corresponding to the type of the image designated in advance. Accordingly, the noise reducer 90 outputs noise-removed image data obtained by removing noise from the designated image data.

Therefore, in step 204, the CPU 51 acquires the noise-removed image data output by the noise reducer 90, stores the noise-removed image data in the storage unit 53, and then finishes the noise removal processing.

As described above, according to the learning device of the present embodiment, the noise of the first learning data is removed using the noise reducer that is trainable. The predetermined noise to be added is added to the first learning data in which the noise is removed. The noise reducer is trained to bring the distribution of the first learning data to which the noise to be added is added close to the distribution of the second learning data. Accordingly, the noise reducer can be trained even in a case where learning data having a smaller amount of noise than a normal captured image cannot be acquired or in a case where an amount of noise in learning data having the same noise as the normal captured image is unknown.

According to the learning device of the present embodiment, the second learning data is the same data as the first learning data. Accordingly, the noise reducer can be trained without newly preparing the second learning data.

According to the learning device of the present embodiment, the noise to be added is noise that resembles the noise of the first learning data. Accordingly, the noise reducer can be trained with higher accuracy compared to that in a case where the noise to be added is noise irrespective of the noise of the first learning data.

According to the learning device of the present embodiment, target data for removing noise via the noise reducer is image data. Accordingly, a noise reducer that removes noise of image data can be trained.

According to the learning device of the present embodiment, the image data is a radiation image. Accordingly, a noise reducer that removes noise of image data indicating a radiation image can be trained.

According to the learning device of the present embodiment, the noise reducer is trained to make the distribution of the first learning data to which the noise to be added is added and the distribution of the second learning data unidentifiable by the predetermined identifier. Accordingly, the noise reducer can be trained using a model such as the WGAN-GP that minimizes a difference between the distribution of the first learning data and the distribution of the second learning data.

According to the learning device of the present embodiment, the noise reducer is trained to minimize the degree of deviation between the distribution of the first learning data to which the noise to be added is added and the distribution of the second learning data. Accordingly, the noise reducer can be trained using the degree of deviation.

According to the learning device of the present embodiment, the degree of deviation is the Wasserstein distance (W distance). Accordingly, the noise reducer can be trained more quickly compared to that in a case where a value based on an information amount is applied as the degree of deviation.

Second Embodiment

An example of an aspect in which the noise reducer 90 is trained using fully unsupervised learning has been described in the embodiment. In the present embodiment, an example of an aspect in which the noise reducer 90 is trained using semi-supervised learning will be described.

An overall configuration of the image processing system 1 according to the present embodiment is substantially the same as that according to the first embodiment. Thus, its description will be omitted. A flow of learning processing executed in the learning device 30 according to the present embodiment will be described with reference to FIG. 15. FIG. 15 is a block diagram for describing the learning processing according to the present embodiment. The same constituents as those illustrated in FIG. 10 will be designated by the same reference numerals as those in FIG. 10, and their description will be omitted as far as possible.

As illustrated in FIG. 15, the learning device 30 according to the present embodiment is substantially the same as the learning device 30 according to the first embodiment in terms of obtaining the noise-removed learning data 62 by removing noise from the learning data 60 via the noise reducer 90 and obtaining the noise-removed and added learning data 64 by adding the noise image to the noise-removed learning data 62 via the noise generator 92.

Then, in the learning device 30 according to the first embodiment, the W distance between the noise-removed and added learning data 64 and the learning data 60 is obtained, and the noise reducer 90 is trained to minimize the W distance. Meanwhile, in the learning device 30 according to the present embodiment, the W distance between the noise-removed and added learning data 64 and image data 66 having a smaller amount of noise than the original learning data 60 is obtained, and the noise reducer 90 is trained to minimize the W distance. In this aspect, an amount of noise to be added to the noise-removed learning data 62 by the noise generator 92 is preferably larger than an amount of noise of the image data 66.

In a technique in the related art in which learning is performed using image data not having noise or image data having a small amount of noise, an image having higher image quality than an image indicated by the image data cannot be obtained. However, in the learning device 30 according to the present embodiment, an image having higher image quality than the image can be obtained.

As described above, an example of an aspect in which the first learning data and the second learning data of the disclosed technology are different from each other is illustrated in the present embodiment. However, this aspect is not limited to the technology described in the present embodiment. For example, the present disclosure may include an aspect in which data obtained by imaging the same part using another modality is used as the second learning data. In this case, domain conversion of the image is performed at the same time as noise removal.

Third Embodiment

An example of an aspect in which the noise reducer 90 is trained by combining unsupervised learning and supervised learning will be described in the present embodiment.

Figure 16:
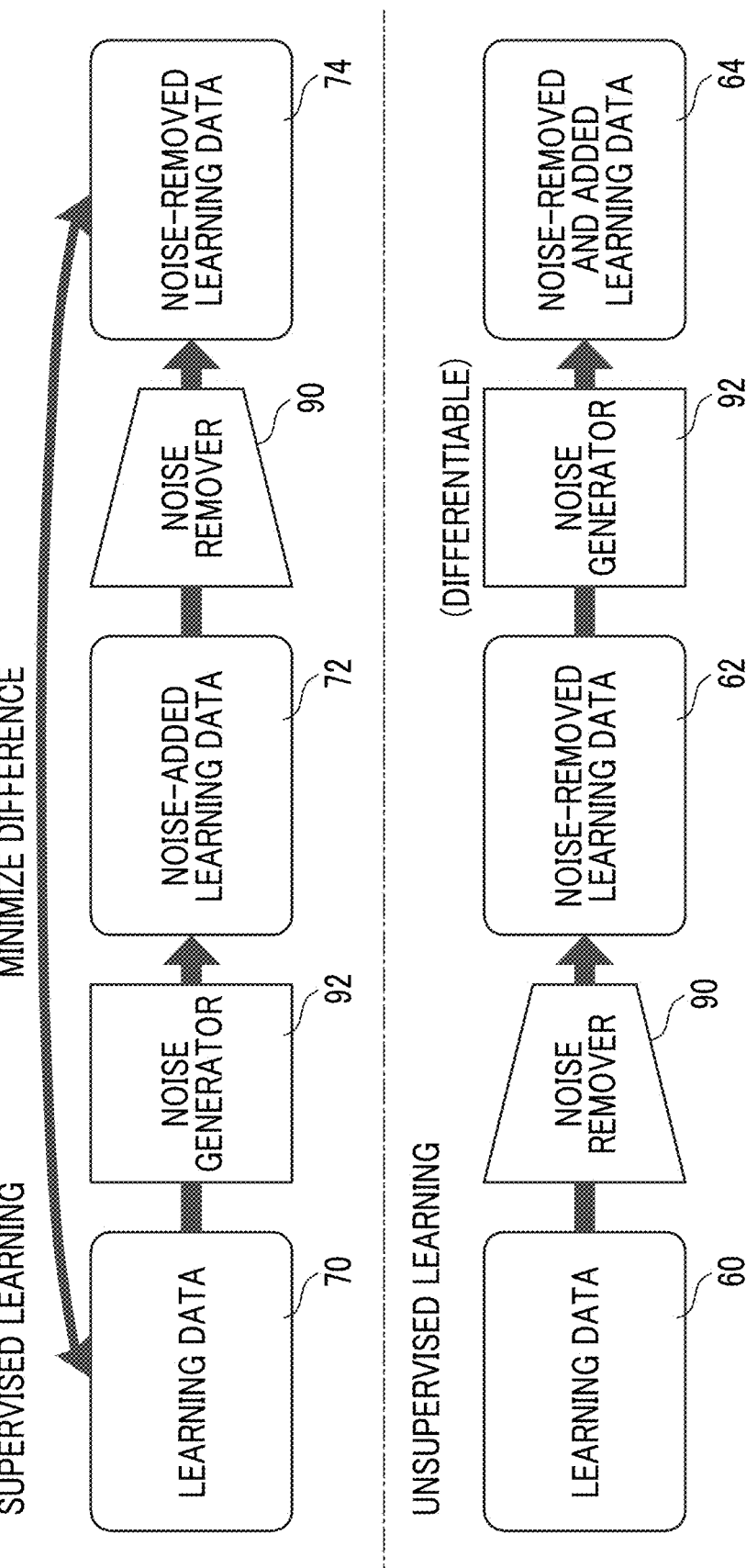
FIG. 16 is a block diagram for describing learning processing according to a third embodiment.

An overall configuration of the image processing system 1 according to the present embodiment is substantially the same as that according to the first embodiment. Thus, its description will be omitted. A flow of learning processing executed in the learning device 30 according to the present embodiment will be described with reference to FIG. 16. FIG. 16 is a block diagram for describing the learning processing according to the present embodiment. The same constituents as those illustrated in FIG. 10 will be designated by the same reference numerals as those in FIG. 10, and their description will be omitted as far as possible.

As illustrated in FIG. 16, the learning device 30 according to the present embodiment is different from the learning device 30 according to the first embodiment in that supervised learning illustrated in an upper part of FIG. 16 is applied in addition to unsupervised learning performed by the learning device 30 according to the first embodiment as illustrated in a lower part of FIG. 16.

As illustrated in the upper part of FIG. 16, in terms of the supervised learning according to the present embodiment, noise-added learning data 72 is generated by adding noise to learning data 70 that is image data having a small amount of noise via the noise generator 92. In terms of the supervised learning according to the present embodiment, noise-removed learning data 74 is generated by removing noise from the generated noise-added learning data 72 via the noise reducer 90.

In terms of the supervised learning according to the present embodiment, the noise reducer 90 is trained to minimize a difference between the noise-removed learning data 74 and the learning data 70.

This aspect may include an aspect in which the unsupervised learning and the supervised learning are performed in parallel, or an aspect in which the supervised learning is performed after the unsupervised learning is performed.

In this aspect, the noise reducer 90 having higher performance can be obtained compared to that trained by the learning device 30 according to the first embodiment.

Next, an effect of the learning processing according to the embodiment will be described with reference to FIGS. 17 and 18.

Figure 17:
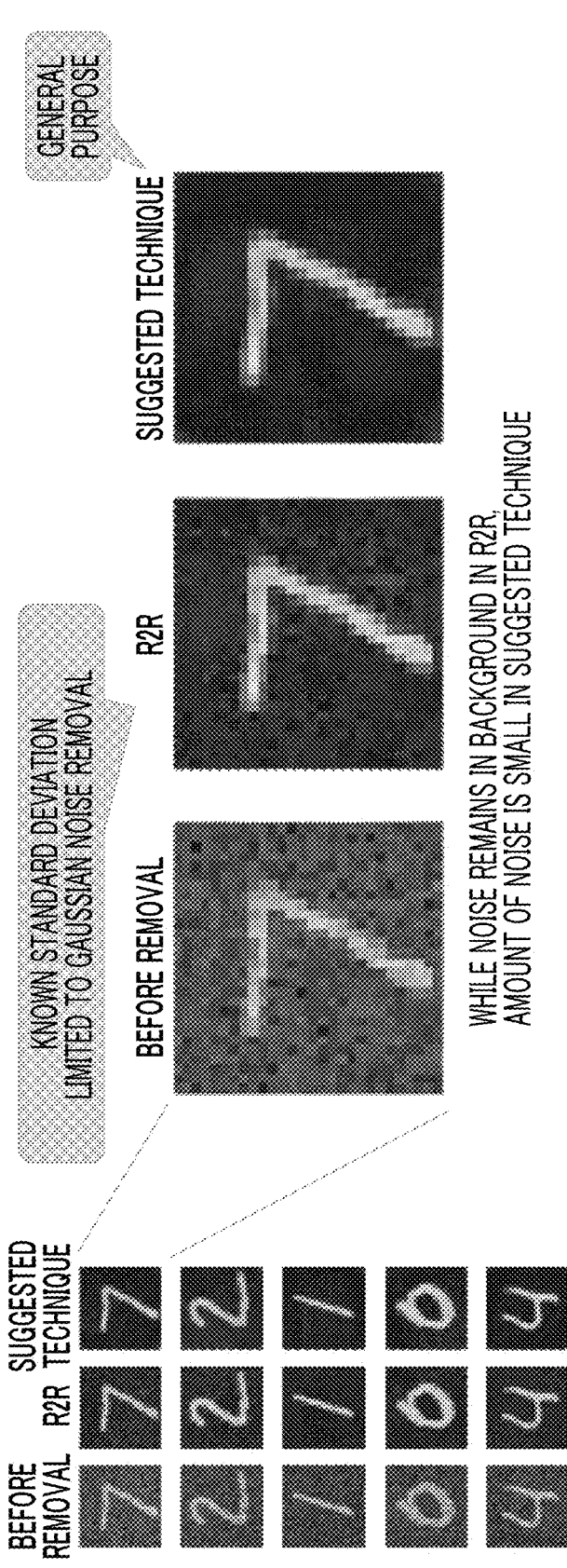
FIG. 17 is a diagram for describing an effect of the learning processing according to the embodiment.
Figure 18:
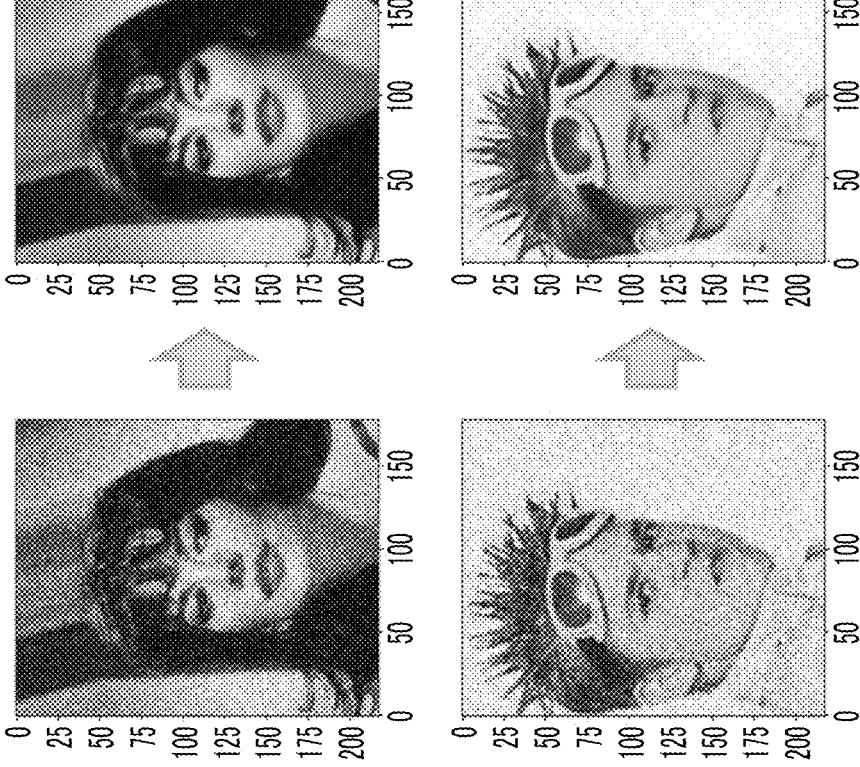
FIG. 18 is a diagram for describing an effect of the learning processing according to the embodiment.

FIG. 17 is a diagram illustrating an example of image data from which noise is removed using the noise reducer 90 trained through the learning processing according to the first embodiment using a Mixed National Institute of Standards and Technology database (MNIST) data set. FIG. 18 is a diagram illustrating an example of image data from which noise is removed using the noise reducer 90 trained through the learning processing according to the first embodiment using a CelebA (https://mmlab.ie.cuhk.edu.hk/projects/CelebA.html) data set. In the example illustrated in FIG. 17, an experiment is performed in a state where Gaussian noise is applied as a type of noise and where an amount of noise is unknown for each image in a standard deviation range of 0.15 to 0.3. A noise removal result referred to as "R2R" in FIG. 17 is a noise removal result obtained using the method according to Recorrupted-to-Recorrupted: Unsupervised Deep Learning for Image Denoising (Pang+, IEEE/CVF Computer Vision and Pattern Recognition 2021).

As illustrated in FIG. 17, in removing noise using the method of R2R for an image of a number in the MNIST data set, noise slightly remains in a background part of the number. However, in removing noise using the noise reducer 90 according to the first embodiment, an amount of noise in the background of the number is extremely small. As illustrated in FIG. 18, even for a face image in the CelebA data set, noise generated in an original image is almost removed in removing noise using the noise reducer 90 according to the first embodiment.

As described above, a noise removal effect is extremely high in the noise reducer 90 according to the embodiment.

While a case where the CPU 31 of the learning device 30 is applied as a processor of the disclosed technology has been described in the embodiment, the present disclosure is not limited to this. For example, the present disclosure may include an aspect in which the CPU 11 of the server 10 or the CPU 51 of the noise removal device 50 is applied as the processor of the disclosed technology, or an aspect in which a plurality of CPUs among the CPUs constitute the processor of the disclosed technology.

In the embodiment, for example, various processors illustrated below can be used as a hardware structure of a processing unit that executes various types of processing, such as the noise removal unit 31A, the noise addition unit 31B, the learning unit 31C, and the acquisition unit 51A. The various processors include, in addition to a CPU that is a general-purpose processor functioning as various processing units by executing software (program) as described above, a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be composed of one of the various processors or may be composed of a combination of two or more processors of the same type or different types (for example, a combination of a plurality of FPGAs or a combination of a CPU and an FPGA). A plurality of processing units may be composed of one processor.

As an example of the plurality of processing units composed of one processor, first, the present disclosure includes an aspect in which one processor is composed of a combination of one or more CPUs and software, and the processor functions as the plurality of processing units, as represented by a computer such as a client and a server. Second, the present disclosure includes an aspect of using a processor that implements functions of the entire system including the plurality of processing units in one integrated circuit (IC) chip, as represented by a system on chip (SoC). As described above, various processing units are configured using one or more of the various processors as the hardware structure.

More specifically, an electric circuit (circuitry) in which circuit elements such as semiconductor elements are combined can be used as the hardware structure of the various processors.

While an aspect in which the learning processing program 33A and the noise removal program 53A are stored (installed) in advance in the storage unit 33 of the learning device 30 and the storage unit 53 of the noise removal device 50, respectively, has been described in the embodiment, the present disclosure is not limited to this. The present disclosure may include an aspect in which these programs are provided as a recording on a recording medium such as a compact disc read only memory (CD-ROM), a digital versatile disc read only memory (DVD-ROM), and a universal serial bus (USB) memory. The present disclosure may also include an aspect in which these programs are downloaded from an external apparatus through a network.

The invention according to appendices below can be perceived from the above description.

APPENDIX 1

A learning device comprising at least one processor, in which the processor is configured to remove noise of first learning data using a noise reducer that is trainable, add predetermined noise to be added to the first learning data in which the noise is removed, and train the noise reducer to bring a distribution of the first learning data to which the noise to be added is added close to a distribution of second learning data.

APPENDIX 2

The learning device according to Appendix 1, in which the second learning data is the same data as the first learning data.

APPENDIX 3

The learning device according to Appendix 1 or 2, in which the noise to be added is noise that resembles the noise of the first learning data.

APPENDIX 4

The learning device according to any one of Appendices 1 to 3, in which the noise reducer is a deep learning model.

APPENDIX 5

The learning device according to any one of Appendices 1 to 4, in which target data for removing noise via the noise reducer is image data.

APPENDIX 6

The learning device according to Appendix 5, in which the image data is a radiation image.

APPENDIX 7

The learning device according to Appendix 2, in which the processor is configured to train the noise reducer to make the distribution of the first learning data to which the noise to be added is added and the distribution of the second learning data unidentifiable by a predetermined identifier.

APPENDIX 8

The learning device according to Appendix 2, in which the processor is configured to train the noise reducer to minimize a degree of deviation between the distribution of the first learning data to which the noise to be added is added and the distribution of the second learning data.

APPENDIX 9

The learning device according to Appendix 8, in which the degree of deviation is a Wasserstein distance or a value based on an information amount.

APPENDIX 10

A noise removal device comprising a noise reducer trained by the learning device according to any one of Appendices 1 to 9, and an acquisition unit that acquires predetermined data in which noise included in the data is removed by inputting the data into the noise reducer.

APPENDIX 11

A program causing a computer to execute a process comprising removing noise of first learning data using a noise reducer that is trainable, adding predetermined noise to be added to the first learning data in which the noise is removed, and training the noise reducer to bring a distribution of the first learning data to which the noise to be added is added close to a distribution of second learning data.

The present disclosure has been conceived in view of the above circumstances, and an object of the present disclosure is to provide a learning device, a noise removal device, and a program that can train a noise reducer even in a case where learning data having a smaller amount of noise than a normal captured image cannot be acquired or in a case where an amount of noise in learning data having the same noise as the normal captured image is unknown.

In order to achieve the object, according to a first aspect of the present disclosure, there is provided a learning device comprising at least one processor, in which the processor is configured to remove noise of first learning data using a noise reducer that is trainable, add predetermined noise to be added to the first learning data in which the noise is removed, and train the noise reducer to bring a distribution of the first learning data to which the noise to be added is added close to a distribution of second learning data.

According to a second aspect of the present disclosure, in the learning device according to the first aspect, the second learning data is the same data as the first learning data.

According to a third aspect of the present disclosure, in the learning device according to the first aspect, the noise to be added is noise that resembles the noise of the first learning data.

According to a fourth aspect of the present disclosure, in the learning device according to the first aspect, the noise reducer is a deep learning model.

According to a fifth aspect of the present disclosure, in the learning device according to the first aspect, target data for removing noise via the noise reducer is image data.

According to a sixth aspect of the present disclosure, in the learning device according to the fifth aspect, the image data is a radiation image.

According to a seventh aspect of the present disclosure, in the learning device according to the second aspect, the processor is configured to train the noise reducer to make the distribution of the first learning data to which the noise to be added is added and the distribution of the second learning data unidentifiable by a predetermined identifier.

According to an eighth aspect of the present disclosure, in the learning device according to the second aspect, the processor is configured to train the noise reducer to minimize a degree of deviation between the distribution of the first learning data to which the noise to be added is added and the distribution of the second learning data.

According to a ninth aspect of the present disclosure, in the learning device according to the eighth aspect, the degree of deviation is a Wasserstein distance or a value based on an information amount.

In order to achieve the object, according to a tenth aspect of the present disclosure, there is provided a noise removal device comprising a noise reducer trained by the learning device according to any one of the first to ninth aspects, and an acquisition unit that acquires predetermined data in which noise included in the data is removed by inputting the data into the noise reducer.

In order to achieve the object, according to an eleventh aspect of the present disclosure, there is provided a program causing a computer to execute a process comprising removing noise of first learning data using a noise reducer that is trainable, adding predetermined noise to be added to the first learning data in which the noise is removed, and training the noise reducer to bring a distribution of the first learning data to which the noise to be added is added close to a distribution of second learning data.

According to the present disclosure, the noise reducer can be trained even in a case where learning data having a smaller amount of noise than a normal captured image cannot be acquired or in a case where an amount of noise in learning data having the same noise as the normal captured image is unknown.

17

18

What is claimed is:

1. A learner comprising:

at least one processor, wherein the processor is configured to:

reduce original noise of first learning data which is image data acquired by an imaging apparatus that includes the original noise generated in the imaging apparatus, using a noise reducer that is trainable;

add simulated noise to the first learning data in which the original noise is reduced to generate simulated-noise added first learning data, the simulated noise being generated, by a noise generator, to simulate the original noise generated in the imaging apparatus; and train the noise reducer to minimize deviation between a distribution of the simulated-noise added first learning data and a distribution of second learning data that is the same data as the first learning data, and which includes the original noise of the first learning data, wherein the learner is configured to train the noise reducer, and wherein the noise generator comprises a plurality of noise generators respectively corresponding to a plurality of types of imaging apparatus or image data, and the noise generator is configured to select one of the plurality of noise generators based on a type of the imaging apparatus or the image data associated with the first learning data.

2. The learner according to claim 1, wherein the noise reducer is a deep learning model.

3. The learner according to claim 1, wherein target data for reducing noise via the noise reducer is image data.

4. The learner according to claim 3, wherein the image data is a radiation image.

5. The learner according to claim 1, wherein the processor is configured to train the noise reducer to make the distribution of the simulated-noise added first learning data and the distribution of the second learning data unidentifiable by a predetermined identifier.

6. The learner according to claim 1, wherein the deviation is a Wasserstein distance or a value based on an information amount.

7. A noise reduction device comprising:

a noise reducer; and an acquirer, wherein the noise reducer is trained by a learner that includes:

at least one processor that is configured to:

reduce original noise of first learning data, which is image data acquired by an imaging apparatus that includes the original noise generated in the imaging apparatus, using the noise reducer that is trainable;

add simulated noise to the first learning data in which the original noise is reduced to generate simulated-noise added first learning data, the simulated noise being generated, by a noise generator, to simulate the original noise generated in the imaging apparatus; and train the noise reducer to minimize deviation between a distribution of the simulated-noise added first learning data and a distribution of second learning data that is the same as the first learning data, and which includes the original noise of the first learning data, wherein the acquirer acquires the first learning data, in which the original noise is reduced, by inputting the first learning data into the noise reducer, and wherein the noise generator comprises a plurality of noise generators respectively corresponding to a plurality of types of imaging apparatus or image data, and the noise generator is configured to select one of the plurality of noise generators based on a type of the imaging apparatus or the image data associated with the first learning data.

8. A non-transitory storage medium storing a learning program causing a computer to execute a learning process comprising:

reducing original noise of first learning data which is image data acquired by an imaging apparatus that includes the original noise generated in the imaging apparatus, using a noise reducer that is trainable;

adding simulated noise to the first learning data in which the original noise is reduced to generate simulated-noise added first learning data, the simulated noise being generated, by a noise generator, to simulate the original noise generated in the imaging apparatus; and training the noise reducer to minimize deviation between a distribution of the simulated-noise added first learning data and a distribution of second learning data that is the same data as the first learning data, and which includes the original noise of the first learning data, wherein the learning process is configured to train the noise reducer, and wherein the noise generator comprises a plurality of noise generators respectively corresponding to a plurality of types of imaging apparatus or image data, and the noise generator is configured to select one of the plurality of noise generators based on a type of the imaging apparatus or the image data associated with the first learning data.

9. The learner according to claim 1, wherein the learner further includes an identifier configured to receive the first learning data and the simulated-noise added first learning data and to output a scalar value for each of the received data, and wherein the processor is configured to train the noise reducer such that a Wasserstein distance, which is calculated based on outputs of the identifier, between a distribution of the first learning data and a distribution of the simulated-noise added first learning data is minimized.

* * * * *